US009657630B2

(12) United States Patent
Perrin et al.

(10) Patent No.: US 9,657,630 B2
(45) Date of Patent: May 23, 2017

(54) DIAGNOSTIC SYSTEMS AND METHODS FOR SELECTIVE CATALYTIC REDUCTION (SCR) SYSTEMS BASED ON NOX SENSOR FEEDBACK

(75) Inventors: James M. Perrin, Livonia, MI (US); Stephen Paul Levijoki, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1613 days.

(21) Appl. No.: 12/369,215

(22) Filed: Feb. 11, 2009

(65) Prior Publication Data

US 2010/0154386 A1    Jun. 24, 2010

Related U.S. Application Data

(60) Provisional application No. 61/138,713, filed on Dec. 18, 2008.

(51) Int. Cl.

| | |
|---|---|
| *F01N 3/00* | (2006.01) |
| *F01N 11/00* | (2006.01) |
| *F01N 3/10* | (2006.01) |
| *F01N 3/20* | (2006.01) |
| *F01N 13/00* | (2010.01) |
| *F01N 3/021* | (2006.01) |

(52) U.S. Cl.
CPC ............. *F01N 11/00* (2013.01); *F01N 3/103* (2013.01); *F01N 3/208* (2013.01); *F01N 13/009* (2014.06); *F01N 3/021* (2013.01); *F01N 2560/026* (2013.01); *F01N 2560/14* (2013.01); *Y02T 10/24* (2013.01); *Y02T 10/47* (2013.01)

(58) Field of Classification Search
CPC ........................................................ F01N 11/00
USPC ............... 60/274, 277, 273, 276, 286, 299
See application file for complete search history.

(56) References Cited

U.S. PATENT DOCUMENTS

| | | | |
|---|---|---|---|
| 6,546,720 B2* | 4/2003 | van Nieuwstadt | 60/286 |
| 7,067,319 B2* | 6/2006 | Wills et al. | 436/37 |
| 2005/0096278 A1* | 5/2005 | Ellsworth et al. | 514/19 |
| 2006/0096278 A1* | 5/2006 | Lueders et al. | 60/286 |
| 2007/0044457 A1* | 3/2007 | Upadhyay et al. | 60/295 |
| 2007/0079597 A1* | 4/2007 | Wang et al. | 60/277 |
| 2008/0022658 A1* | 1/2008 | Viola et al. | 60/286 |
| 2008/0178575 A1* | 7/2008 | Shaikh et al. | 60/274 |
| 2008/0178656 A1 | 7/2008 | Nieuwstadt | |
| 2008/0306673 A1* | 12/2008 | Yasui et al. | 701/102 |

(Continued)

FOREIGN PATENT DOCUMENTS

| | | |
|---|---|---|
| AT | 501503 T | 3/2011 |
| DE | 19944009 A1 | 3/2001 |

OTHER PUBLICATIONS

Office Action dated Apr. 24, 2012 from the German Patent Office for German Patent Application No. 10 2009 058 003.4; 7 pages.

*Primary Examiner* — Kenneth Bomberg
*Assistant Examiner* — Jason Sheppard

(57) ABSTRACT

A selective catalytic reduction (SCR) system includes a first sensor that determines a first concentration of $NO_x$, a second sensor that determines a second concentration of $NO_x$ and $NH_3$, and a fault determination module. The fault determination module diagnoses a fault in at least one of a dosing agent and a catalyst in an SCR device based on the first and second concentrations.

13 Claims, 4 Drawing Sheets

(56) References Cited

U.S. PATENT DOCUMENTS

2009/0049899 A1* 2/2009 Hjorsberg et al. ......... 73/114.75
2009/0301066 A1* 12/2009 Sindano et al. ............... 60/286
2011/0146235 A1* 6/2011 Hagimoto et al. ............. 60/274

* cited by examiner

DIAGNOSTIC SYSTEMS AND METHODS FOR SELECTIVE CATALYTIC REDUCTION (SCR) SYSTEMS BASED ON NOX SENSOR FEEDBACK

CROSS-REFERENCE TO RELATED APPLICATIONS

This application claims the benefit of U.S. Provisional Application No. 61/138,713, filed on Dec. 18, 2008. The disclosure of the above application is incorporated herein by reference.

FIELD

The present disclosure relates to after-treatment systems for internal combustion engines, and more particularly to diagnostic systems and methods for selective catalytic reduction (SCR) systems based on $NO_x$ sensor feedback.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture to generate drive torque. The combustion process generates exhaust gas that is exhausted from the engine to the atmosphere. The exhaust gas contains nitrogen oxides ($NO_x$), carbon dioxide ($CO_2$), carbon monoxide (CO) and particulates. An after-treatment system treats the exhaust gas to reduce emissions before the exhaust gas is released to atmosphere. In an exemplary after-treatment system, a dosing system injects a dosing agent (e.g., urea) into the exhaust gas upstream from a selective catalytic reduction (SCR) system. Urea breaks down to form ammonia ($NH_3$) through thermal decomposition. $NH_3$ is the reductant that reacts with $NO_x$ over the catalyst in the SCR system.

SUMMARY

A selective catalytic reduction (SCR) system includes a first sensor that determines a first concentration of $NO_x$, a second sensor that determines a second concentration of $NO_x$ and $NH_3$, and a fault determination module. The fault determination module diagnoses a fault in at least one of a dosing agent and a catalyst in an SCR device based on the first and second concentrations.

In other features, the first sensor is a $NO_x$ sensor that is provided upstream from an SCR device. The second sensor is a $NO_x$ sensor that is provided downstream from the SCR device and is cross-sensitive to $NH_3$. The second concentration corresponds to a combined concentration of $NO_x$ and $NH_3$. The fault determination module diagnoses a fault in the catalyst when the second concentration is greater than the first concentration. The fault determination module diagnoses poor quality of the dosing agent when the second concentration is within a range of the first concentration.

A method of diagnosing a selective catalytic reduction (SCR) system includes determining a first concentration of $NO_x$; determining a second concentration of $NO_x$ and $NH_3$; and diagnosing a fault in at least one of a dosing agent and a catalyst in the SCR system based on the first concentration and the second concentration.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
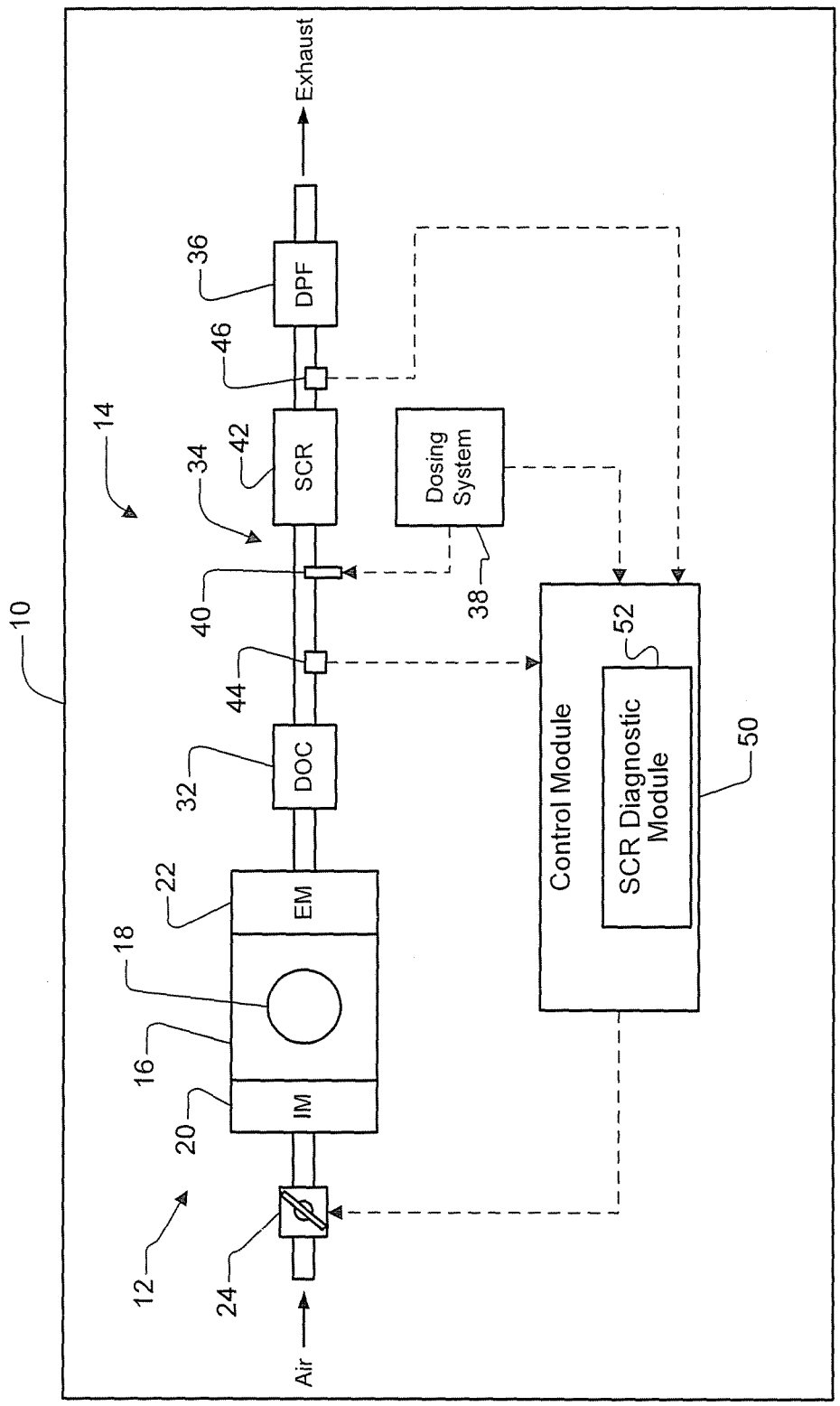
FIG. 1 is a functional block diagram of an exemplary vehicle system that includes a selective catalytic reduction (SCR) diagnostic module according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, and/or a combinational logic circuit.

$NO_x$ sensors may be provided upstream and downstream from a SCR system to monitor $NO_x$ concentration in the exhaust gas. A conversion efficiency of the SCR system may be determined based on measurements by the $NO_x$ sensors. When the conversion efficiency is below a threshold, the SCR system is diagnosed as faulty. The conversion efficiency, however, provides no information as to which part of the SCR system contributes to the poor efficiency.

An SCR diagnostic module according to the present disclosure determines a first $NO_x$ concentration using a first $NO_x$ sensor and a second $NO_x/NH_3$ concentration using a second $NO_x$ sensor. The first and second $NO_x$ sensors are provided upstream and downstream from the SCR system, respectively. The second $NO_x$ sensor is cross-sensitive to $NH_3$. The diagnostic module diagnoses a fault in a catalyst of the SCR system when the second $NO_x/NH_3$ concentration is higher than the first $NO_x$ concentration. The diagnostic module diagnoses poor quality of a dosing agent when the first $NO_x$ concentration is within a range of the second $NO_x/NH_3$ concentration.

Referring now to FIG. 1, an exemplary vehicle system 10 includes an engine system 12 and an after-treatment system 14. The engine system 12 includes an engine 16 having a cylinder 18, an intake manifold 20, and an exhaust manifold 22. Air flows into the intake manifold 20 through a throttle 24. The air is mixed with fuel and the air and fuel mixture is combusted within the cylinder 18 to drive a piston (not shown). Although a single cylinder 18 is illustrated, the engine system 12 may include additional cylinders 18. For example, engines having 2, 3, 4, 5, 6, 8, 10, 12 and 16 cylinders are anticipated. It is anticipated that the present disclosure can be implemented in both gasoline engines and diesel engines.

Exhaust gas is produced through the combustion process and is exhausted from the cylinder 18 into the exhaust manifold 22. The after-treatment system 14 treats the exhaust gas that flows therethrough to reduce emissions before the exhaust gas is released to atmosphere. The after-treatment system 14 includes a diesel oxidation catalyst (DOC) 32, a selective catalytic reduction (SCR) system 34, and a diesel particulate filter (DPF) 36. The DOC 32 reduces particulate matter (PM), hydrocarbon based soluble organic fraction (SOF), and carbon monoxide content via oxidation. The SCR system 34 removes $NO_x$ via reduction. The DPF 36 removes diesel particulate matter and/or soot from the exhaust gas. The DOC 32, the SCR system 34, and the DPF 36 may be arranged in an order different from that shown in FIG. 1.

The SCR system 34 includes a dosing system 38, an injector 40, and an SCR device 42. The dosing system 38 injects a dosing agent (i.e., urea) into the exhaust gas upstream from the SCR device 42 through the injector 40. Urea is converted into $NH_3$ by thermal decomposition. $NH_3$ is the reductant that reacts with $NO_x$ over a catalyst in the SCR device 42 to reduce $NO_x$. The following exemplary, chemical relationships describe the $NO_x$ reduction:

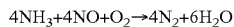

$4NH_3+4NO+O_2 \rightarrow 4N_2+6H_2O$

$4NH_3+2NO+2NO_2 \rightarrow 4N_2+6H_2O$

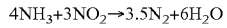

$4NH_3+3NO_2 \rightarrow 3.5N_2+6H_2O$

The required amount of $NH_3$, and consequently the amount of urea to be injected into the exhaust gas, depends on concentration of $NO_x$ upstream from the SCR device 42.

The concentrations of $NO_x$ upstream and downstream from the SCR device 42 are monitored by a first $NO_x$ sensor 44 and a second $NO_x$ sensor 46, respectively. While the first $NO_x$ sensor 44 is shown to be provided between the DOC 32 and the SCR device 42, the first $NO_x$ sensor 44 may be provided at any suitable location between the exhaust manifold 22 and the SCR device 42.

The first $NO_x$ sensor 44 may or may not be cross-sensitive to $NH_3$. The first $NO_x$ sensor 44 outputs a first signal that corresponds to a first $NO_x/NH_3$ concentration upstream from the SCR device 42. When the first $NO_x$ sensor 44 is placed upstream from the injector 40, the first $NO_x$ sensor 44 is not exposed to $NH_3$. Therefore, the first $NO_x/NH_3$ concentration indicates a concentration of $NO_x$ in the exhaust gas upstream from the SCR device 42. If the first $NO_x$ sensor 44 is not responsive to the presence of $NH_3$, the first $NO_x$ sensor 44 may be provided downstream from the injector 40 and upstream from the SCR device 42.

The second $NO_x$ sensor 44 is cross-sensitive to $NH_3$ and is responsive to the presence of both $NH_3$ and $NO_x$. The second $NO_x$ sensor outputs a second signal that corresponds to a second $NO_x/NH_3$ concentration downstream from the SCR device 42. The second $NO_x$ sensor 46 is provided downstream from the injector 40 and may be exposed to $NH_3$. Therefore, the second $NO_x/NH_3$ concentration may correspond to a concentration of $NO_x$, a concentration of $NH_3$, or a combined concentration of $NO_x$ and $NH_3$.

The second signal output by the second $NO_x$ sensor 46 depends on, for example only, the concentration of $NO_x$ upstream from the SCR device 42, the amount of urea injected into the exhaust gas, efficiency of conversion of urea into $NH_3$, and $NO_x$ conversion efficiency of the SCR device 42. $NO_x$ conversion efficiency (or reduction efficiency) is defined as follows:

Conversion efficiency=$(1-m_{downstream}/m_{upstream}) \times 100\%$ wherein $m_{upstream}$ is the concentration of $NO_x$ in the exhaust gas upstream from the SCR device 42 and $m_{downstream}$ is the concentration of $NO_x$ in the exhaust gas downstream from the SCR device 42.

A control module 50 includes an SCR diagnostic module 52 that diagnoses a fault based on the first signal from the first $NO_x$ sensor 44 and the second signal from the second $NO_x$ sensor 46.

Figure 2:
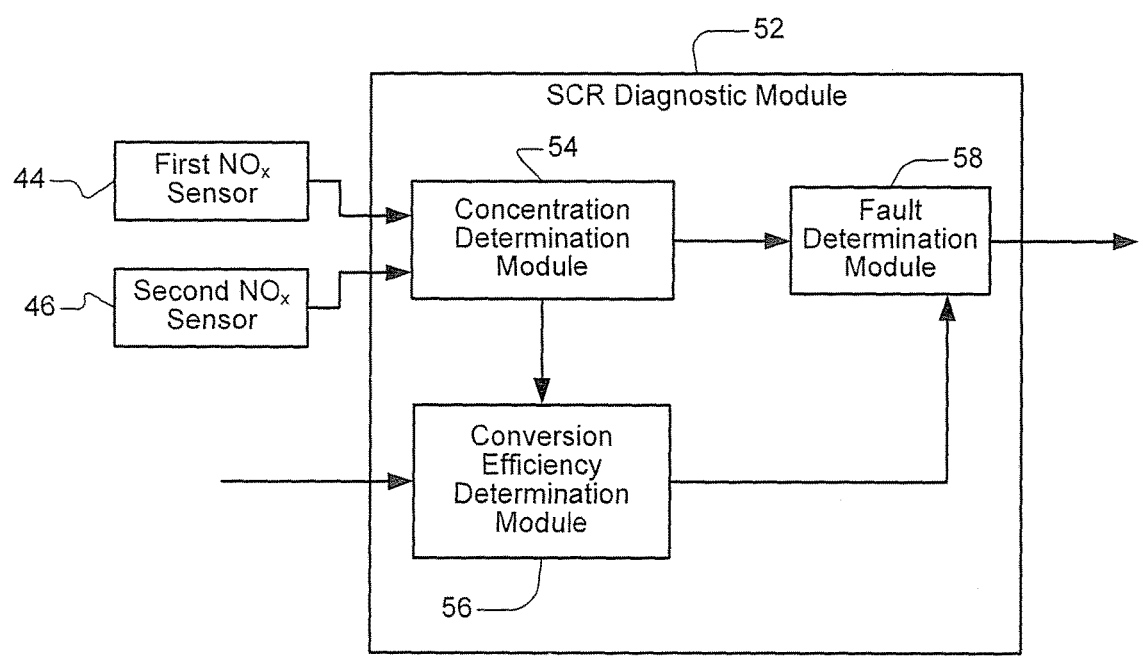
FIG. 2 is a functional block diagram of a SCR diagnostic module according to the present disclosure.

Referring to FIG. 2, the SCR diagnostic module 52 includes a concentration determination module 54, a conversion efficiency determination module 56, and a fault determination module 58. The concentration determination module 54 determines a first $NO_x/NH_3$ concentration and a second $NO_x/NH_3$ concentration upstream and downstream from the SCR device 42. The conversion efficiency determination module 56 determines conversion efficiency based on the first $NO_x/NH_3$ concentration and the second $NO_x/NH_3$ concentration. The fault determination module 58 diagnoses a fault in one of the dosing agent (i.e., urea) and the catalyst in the SCR device 42 by comparing the first $NO_x/NH_3$ concentration with the second $NO_x/NH_3$ concentration.

More specifically, the concentration determination module 54 determines a first $NO_x/NH_3$ concentration and a second $NO_x/NH_3$ concentration based on first and second signals from the first and second $NO_x$ sensors 44 and 46, respectively. The first $NO_x/NH_3$ concentration corresponds to a concentration of $NO_x$ upstream from the SCR device 42 (i.e., $m_{upstream}$). The second $NO_x$ sensor 46 is cross-sensitive to $NH_3$. Therefore, the second $NO_x/NH_3$ concentration does not necessarily correspond to a concentration of $NO_x$ downstream from the SCR device 42 and may correspond to a combined concentration of $NO_x$ and $NH_3$ when $NH_3$ is present in the exhaust gas.

The conversion efficiency determination module 56 determines conversion efficiency of the SCR system 34 based on the first $NO_x/NH_3$ concentration and the second $NO_x/NH_3$ concentration. While the second $NO_x/NH_3$ concentration does not necessarily reflect the actual concentration of $NO_x$ downstream from the SCR device 42, the conversion efficiency based on the second $NO_x/NH_3$ concentration can still provide an indication of good or poor conversion efficiency with proper calibrations. When the conversion efficiency is below a first threshold, the SCR system 34 is diagnosed as faulty. The fault determination module 58 determines which part of the SCR system 34 fails and contributes to the poor conversion efficiency.

Alternatively, an additional $NO_x$ sensor that is not cross-sensitive to $NH_3$ may be provided downstream from the SCR device 42 to measure the actual downstream $NO_x$ concentration. As such, the actual conversion efficiency may be determined to more accurately determine whether the SCR system 34 fails. Alternatively, the downstream $NO_x$ concentration may be estimated based on engine parameters.

Figure 3:
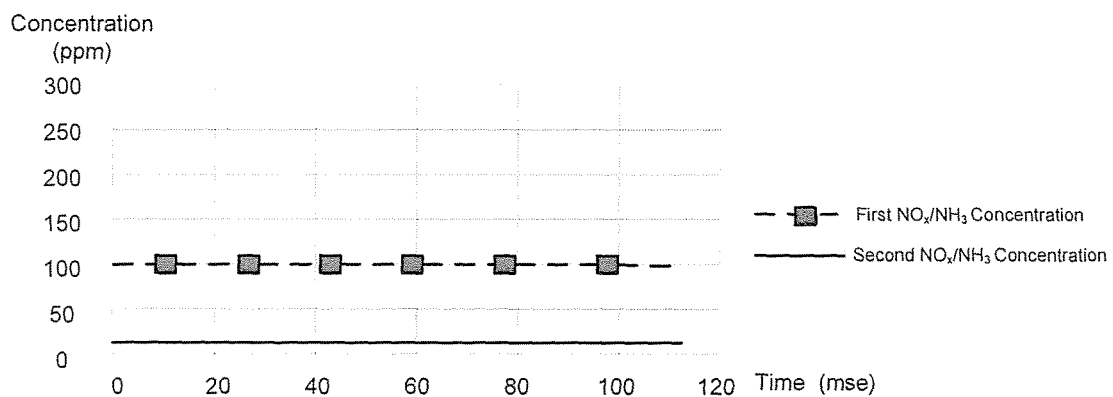
FIG. 3 is an exemplary graph of measured concentrations by first and second $NO_x$ sensors upstream and downstream from an SCR system that has acceptable conversion efficiency.

FIG. 3 illustrates exemplary first and second $NO_x/NH_3$ concentrations for an SCR system 34 that performs as desired (e.g., with a conversion efficiency above a threshold). In this example, the first $NO_x/NH_3$ concentration is 100 ppm and the second $NO_x/NH_3$ concentration is 5 ppm. The second $NO_x/NH_3$ concentration is lower than the first $NO_x/NH_3$ concentration and the conversion efficiency is 95%.

Figure 4:
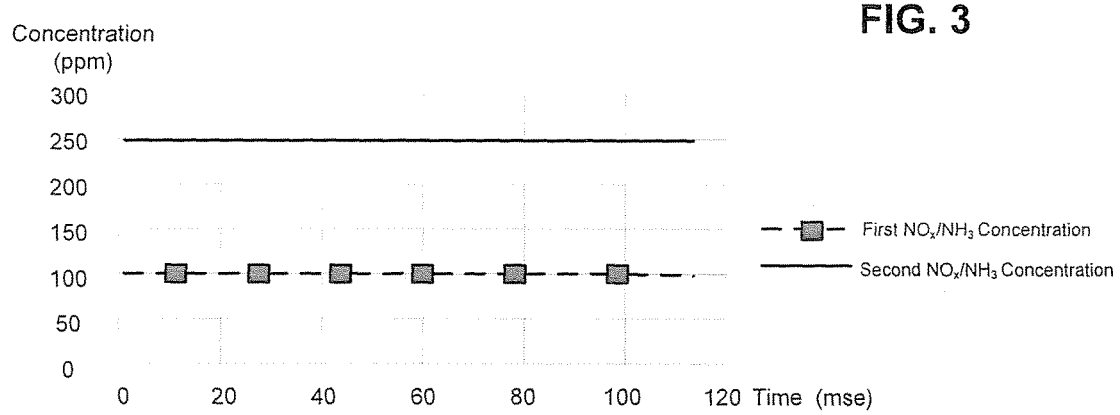
FIGS. 4 and 5 are exemplary graphs of measured concentrations by first and second $NO_x$ sensors upstream and downstream from an SCR system that has poor conversion efficiency.

FIG. 4 illustrates exemplary first and second $NO_x/NH_3$ concentrations for an SCR system 34 that does not perform as desired (e.g., with a conversion efficiency below a threshold). In this example, the first $NO_x/NH_3$ concentration is 100 ppm and the second $NO_x/NH_3$ concentration is 250 ppm. The second $NO_x/NH_3$ concentration is higher than the first $NO_x/NH_3$ concentration. The conversion efficiency based on the first and second $NO_x/NH_3$ concentrations is negative and below the first threshold.

When a reduction reaction does not occur in the SCR device 42, the actual $NO_x$ concentration downstream from the SCR device 42 should be at most equal to the $NO_x$ concentration upstream from the SCR device 42. The second $NO_x$ sensor 46 is cross-sensitive to $NH_3$ and may be exposed to $NH_3$. Therefore, the increased second $NO_x/NH_3$ concentration is attributable to $NH_3$ contained in the exhaust gas downstream from the SCR device 42. The first $NO_x$ sensor 44 is provided upstream from the injector 40 and is not exposed to $NH_3$. The increased $NO_x/NH_3$ concentration indicates that $NH_3$ has been converted from urea, but reduction reaction may not occur or may not be efficient to reduce $NH_3$ and $NO_x$ in the exhaust gas. When the SCR device 42 has a degraded catalyst, the reduction reaction may not occur or may be less efficient. Therefore, the fault determination module 58 diagnoses a fault in the catalyst in the SCR device 42 when the first $NO_x/NH_3$ concentration is higher than the second $NO_x/NH_3$ concentration.

Figure 5:
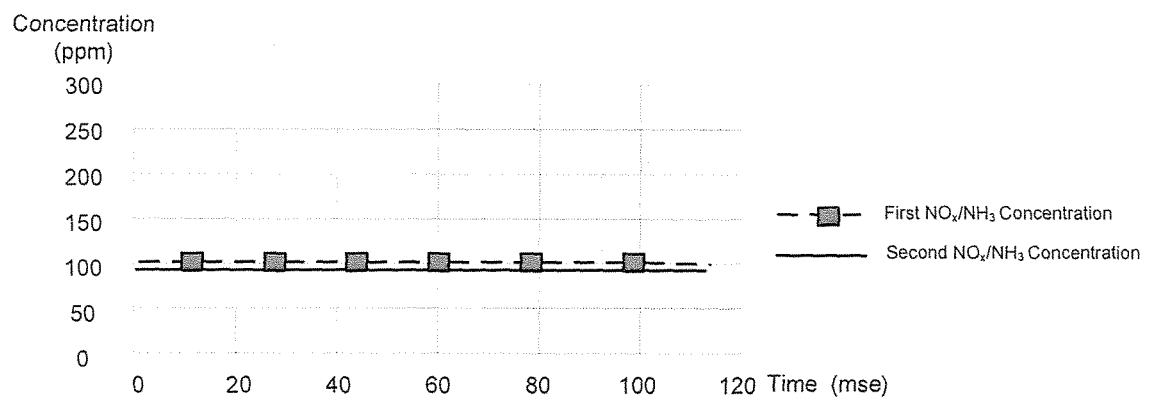

FIG. 5 illustrates other exemplary first and second $NO_x/NH_3$ concentrations for an SCR system 34 with poor conversion efficiency. In this example, the first $NO_x/NH_3$ concentration is 100 ppm and the second $NO_x/NH_3$ concentration is 99 ppm. The second $NO_x/NH_3$ concentration is less than and close to (i.e., within a desired range of) the first $NO_x/NH_3$ concentration. The conversion efficiency is close to zero and below the first threshold. The similar concentration suggests that no reduction reaction occurs in the SCR device 42 and no $NH_3$ is present in the SCR device 42. The reduction reaction is not able to occur without a reductant (i.e., $NH_3$). When urea is diluted with water and/or other chemicals and has poor quality, urea cannot be converted into $NH_3$ in the after-treatment system 14. Therefore, the fault determination module 58 diagnoses poor quality of urea when the second $NO_x/NH_3$ concentration is less than the first $NO_x/NH_3$ concentration but is about the same as the first $NO_x/NH_3$ concentration.

It is noted that the first and second $NO_x$ sensors 44 and 46 may not output the same signal indicating the same concentration when $m_{upstream}$ and $m_{downstream}$ are the same, assuming no $NH_3$ is contained in the exhaust gas. For example only, manufacturing tolerances of $NO_x$ sensors, $NH_3$ storage effect of the SCR device 42, and non-uniform distribution of $NO_x$ in the exhaust gas may affect the measurements of the first and second $NO_x$ sensors 44 and 46. Therefore, the first and second $NO_x/NH_3$ concentrations that are close (i.e., within a desired range) but different may indicate that $m_{upstream}$ and $m_{downstream}$ are the same and no reduction reaction occurs in the SCR device 42. The fault determination module 58 may diagnose a poor quality of urea when the difference between the first and second $NO_x/NH_3$ concentrations is below a second threshold, taking into account the tolerances of the first and second $NO_x$ sensors 44 and 46.

It is appreciated that the SCR diagnostic module 52 of the present disclosure may diagnose poor quality of urea when urea is partially converted into $NH_3$ and reduction reaction is partially performed in the SCR device 42. In this situation, the second $NO_x/NH_3$ concentration may be lower than the first $NO_x/NH_3$ concentration but not within a range of the first $NO_x/NH_3$ concentration. A threshold may be properly selected to differentiate between urea with acceptable dilution and urea with unacceptable dilution.

Alternatively, the fault determination module 58 may use the calculated conversion efficiency to identify which part of the SCR system 34 fails. For example only, the fault determination module 58 may diagnose a fault in the catalyst in the SCR device 42 when the conversion efficiency is negative, as described in connection with FIG. 4. The fault determination module 58 may diagnose poor quality of urea when the conversion efficiency is close to zero, as described in connection with FIG. 5.

Figure 6:
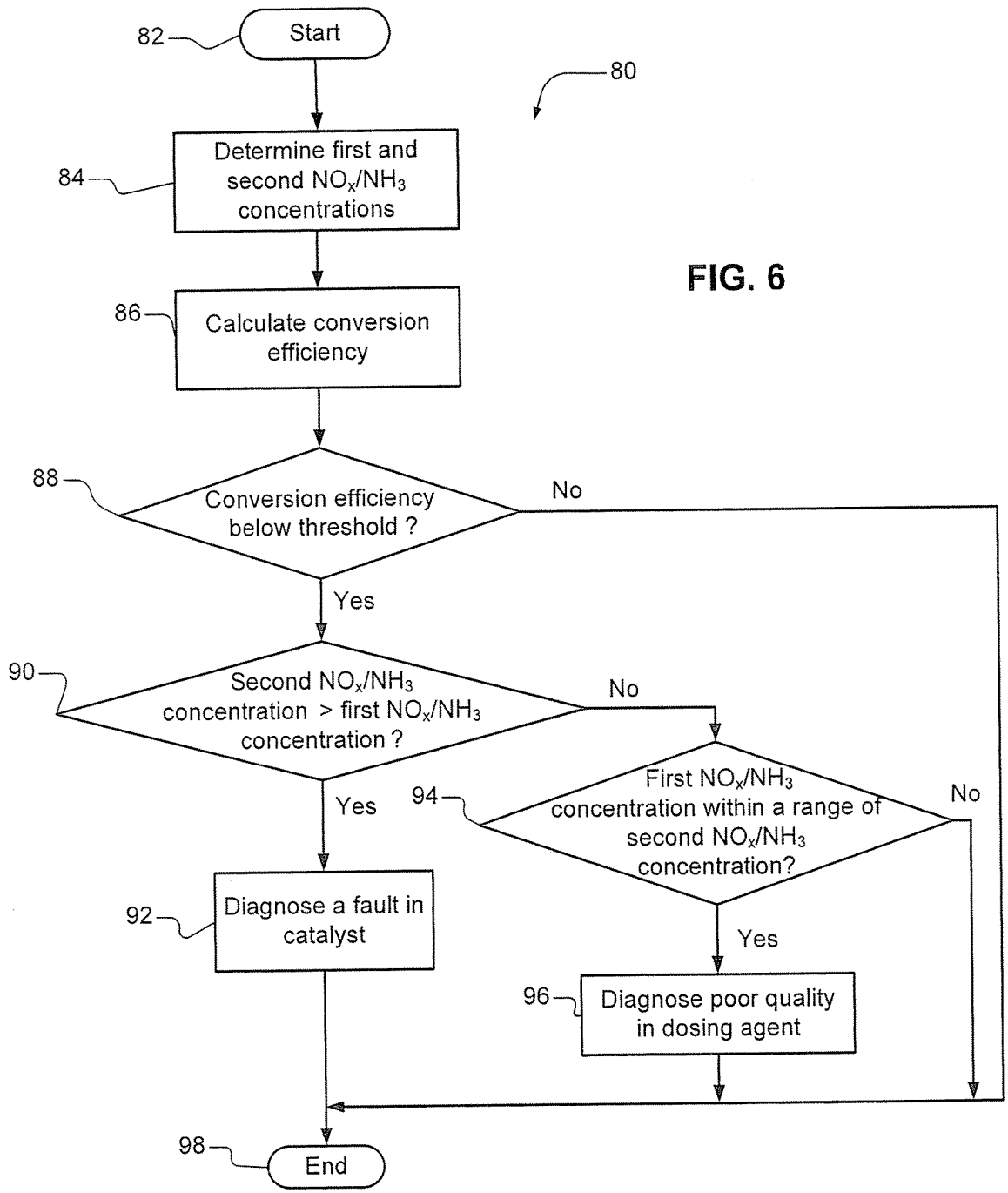
FIG. 6 is a flow diagram of a method of diagnosing an SCR system according to the present disclosure.

Referring now to FIG. 6, a method 80 of diagnosing an SCR system starts in step 82. The concentration determination module 54 determines a first $NO_x/NH_3$ concentration and a second $NO_x/NH_3$ concentration based on the first signal and the second signal, respectively, in step 84. The conversion efficiency determination module 56 determines conversion efficiency based on the first and second $NO_x/NH_3$ concentrations in step 86. When the conversion efficiency is below a first threshold in step 88, the fault determination module 58 compares the first $NO_x/NH_3$ concentration with the second $NO_x/NH_3$ concentration in step 90. When the second $NO_x/NH_3$ concentration is higher than the first $NO_x/NH_3$ concentration, the fault determination module 58 diagnoses a fault in the catalyst of the SCR device 42 in step 92. When the second $NO_x/NH_3$ concentration is less than and is close to (i.e., within a range of) the first $NO_x/NH_3$ concentration in step 94, the fault determination module 58 diagnoses a poor quality of the dosing agent in step 96. The method 80 ends in step 98.

It is noted that the first $NO_x/NH_3$ concentration and the second $NO_x/NH_3$ concentration may be determined by means other than the first and second $NO_x$ sensors. For example, the first $NO_x/NH_3$ may be estimated based on engine operating parameters without using a $NO_x$ sensor. The second $NO_x/NH_3$ concentration may be determined based on measurements of a $NO_x$ sensor and a $NH_3$ sensor.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A selective catalytic reduction (SCR) system comprising:
   a first sensor that determines a first concentration of NOx and NH3 based on a measurement taken upstream of a catalyst;
   a second sensor that determines a second concentration of NOx and NH3 based on a measurement taken downstream of the catalyst; and
   a first electronic circuit configured to:
      compare the first and second concentrations;
      determine whether a catalyst fault occurred in the catalyst based on the comparison between the first and second concentrations; and determine whether a dosing agent fault occurred in a dosing agent that is injected upstream of the catalyst of an SCR device based on the comparison between the first and second concentrations;

wherein the catalyst fault and the dosing agent fault indicate a quality of the dosing agent.

2. The SCR system of claim 1 wherein the first sensor is a NOx sensor that is provided upstream from the SCR device and the second sensor is a NOx sensor that is provided downstream from the SCR device.

3. The SCR system of claim 1 wherein the first electronic circuit is configured to diagnose a catalyst fault in the catalyst when the second concentration is greater than the first concentration.

4. The SCR system of claim 1 wherein the second concentration corresponds to a combined concentration of NOx and NH3.

5. The SCR system of claim 1 further comprising at least one of an Application Specific Integrated Circuit (ASIC), a processor (shared, dedicated, or group) and memory that execute one or more software or firmware programs, and/or a combinational logic circuit that includes the first electronic circuit.

6. The SCR system of claim 1 wherein the first electronic circuit is configured to diagnose poor quality of the dosing agent when the second concentration is within a range of the first concentration.

7. The SCR system of claim 6 wherein the first concentration is greater than the second concentration.

8. The SCR system of claim 6 wherein the first concentration and the second concentration correspond to a concentration of NOx.

9. The SCR system of claim 1 further comprising a second electronic circuit configured to determine a conversion efficiency based on the first concentration and the second concentration.

10. The SCR system of claim 9 wherein the first electronic circuit is configured to diagnose a catalyst fault in the catalyst when the conversion efficiency is negative.

11. The SCR system of claim 9 wherein the first electronic circuit is configured to diagnose poor quality of the dosing agent when the conversion efficiency is close to zero.

12. The SCR system of claim 1 wherein the first electronic circuit is configured to determine:

the catalyst is faulty based on the comparison between the first concentration of NOx and NH3 and the second concentration of NOX and NH3; and the dosing agent is faulty based on the comparison between the first concentration of NOx and NH3 and the second concentration of NOx and NH3.

13. The SCR system of claim 12 wherein the first electronic circuit is configured to:

diagnose a dosing agent fault in the dosing agent if the second concentration is within a range of the first concentration; and diagnose a catalyst fault in the SCR device if the second concentration is greater than the first concentration.

* * * * *